United States Patent
Angelsmark et al.

(10) Patent No.: US 10,437,606 B2
(45) Date of Patent: *Oct. 8, 2019

(54) DISTRIBUTED APPLICATION EXECUTION BASED ON DEVICE-SPECIFIC SUPPORT FOR PLATFORM-INDEPENDENT DEVICE FUNCTIONS

(71) Applicant: Telefonaktiebolaget LM Ericsson (publ), Stockholm (SE)

(72) Inventors: Ola Angelsmark, Ystad (SE); Johan Olsson, Malmö (SE); Per Persson, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,341

(22) Filed: Sep. 10, 2018

(65) Prior Publication Data
US 2019/0026116 A1 Jan. 24, 2019

Related U.S. Application Data

(63) Continuation of application No. 15/950,640, filed on Apr. 11, 2018, now Pat. No. 10,102,011, which is a
(Continued)

(51) Int. Cl.
*G06F 9/44* (2018.01)
*G06F 9/445* (2018.01)
(Continued)

(52) U.S. Cl.
CPC .............. *G06F 9/445* (2013.01); *G06F 8/60* (2013.01); *G06F 9/5055* (2013.01); *H04W 4/90* (2018.02)

(58) Field of Classification Search
CPC .......................................................... G06F 9/44
See application file for complete search history.

(56) References Cited

U.S. PATENT DOCUMENTS 6,772,097 B1 * 8/2004 Kromenaker ........... G06F 13/10
702/108
2006/0123396 A1 * 6/2006 Fox ..................... G06F 9/45504
717/127
(Continued)

FOREIGN PATENT DOCUMENTS

| WO | 2007099073 A1 | 9/2007 |
| WO | 2014026115 A1 | 2/2014 |
| WO | 2016084049 A1 | 6/2016 |

*Primary Examiner* — Jae U Jeon
(74) *Attorney, Agent, or Firm* — Coats & Bennett, PLLC

(57) ABSTRACT

A computing device supports distributed application execution by sending a code module to different remote devices that have different device-specific support for a platform-independent device function, and sending, to at least two of the different remote devices, a platform-independent message indicating an event has occurred in order to trigger each of the at least two of the different remote devices to autonomously select a device-specific function from a plurality of device-specific functions, and execute the different device-specific support for the platform-independent device function. Each of the at least two of the different remote devices comprises an output interface and triggering each of the at least two of the different remote devices to execute the different device-specific support comprises triggering each of the at least two of the different remote devices to use their output interface for outputting differently from each other.

19 Claims, 6 Drawing Sheets

Related U.S. Application Data continuation of application No. 15/429,529, filed on Feb. 10, 2017, now Pat. No. 9,971,610.

(60) Provisional application No. 62/352,075, filed on Jun. 20, 2016.

(51) Int. Cl.
*H04W 4/90* (2018.01)
*G06F 8/60* (2018.01)
*G06F 9/50* (2006.01)

(56) References Cited

U.S. PATENT DOCUMENTS

| | | | |
|---|---|---|---|
| 2007/0213042 A1* | 9/2007 | Amiens | H04L 29/06 455/420 |
| 2009/0313004 A1 | 12/2009 | Levi et al. | |
| 2010/0122088 A1* | 5/2010 | Oxford | G06F 21/10 713/168 |
| 2013/0339935 A1 | 12/2013 | Melamed | |
| 2015/0006719 A1 | 1/2015 | Gupta et al. | |
| 2015/0347188 A1 | 12/2015 | Iyer et al. | |
| 2017/0147314 A1* | 5/2017 | Choi | G06F 8/61 |

\* cited by examiner

DISTRIBUTED APPLICATION EXECUTION BASED ON DEVICE-SPECIFIC SUPPORT FOR PLATFORM-INDEPENDENT DEVICE FUNCTIONS

This application is a continuation of prior U.S. patent application Ser. No. 15/950640, filed 11 Apr. 2018, which is a continuation of prior U.S. patent application Ser. No. 15/429529, filed 10 Feb. 2017, which is issued as U.S. Pat. No. 9,971,610, which in turn claims the benefit of U.S. Provisional Application Ser. No. 62/352075, filed 20 Jun. 2016, the disclosures of which are each incorporated by reference herein in their entireties.

BACKGROUND

Event handling typically involves a system configured to perform specific, detailed, functions. For example, in response to an event, a system may be configured to flash a light, play a sound, or send a message. Such requires a developer to decide beforehand what will happen in response to particular events, such as a fault for example. However, such solutions may not be suitable in particular modern computing environments.

SUMMARY

One or more embodiments herein include a computer-implemented method for supporting distributed application execution. The method comprises receiving an application definition that identifies a plurality of platform-independent device functions to be performed by an application, and mapping the platform-independent device functions to corresponding code modules stored in a code module repository. The method further comprises distributing the corresponding code modules to a plurality of remote devices for distributed execution of the application by the remote devices according to device-specific support for the platform-independent device by the remote devices. The distributing comprises sending a given code module to different remote devices that have different device-specific support for the platform-independent device function corresponding to the given code module.

In some embodiments, the method further comprises triggering execution of the different device-specific support for the platform-independent device function corresponding to the given code module by at least two of the different remote devices by sending, to the least two different remote devices, a platform-independent message indicating an event has occurred.

In some such embodiments, each of the at least two of the different remote devices comprises an output interface for messaging a user and triggering the execution of the different device-specific support by the at least two of the different remote devices comprises triggering each of the at least two of the different remote devices to use their output interface for differently messaging the user.

In some such embodiments, the device-specific support for the platform-independent device function of a given remote device of the at least two different remote devices comprises a plurality of device-specific functions, and sending the platform-independent message to the given remote device further triggers autonomous selection of a device-specific function, by the given remote device, from the plurality of device-specific functions.

In some such embodiments, sending the platform-independent message to the at least two different remote devices is responsive to selecting the at least two different remote devices from the different remote devices based on the event.

In some such embodiments, the method further comprises generating the platform-independent message by a software runtime executing on the computing device and detecting the occurrence of the event by a platform-specific function of the computing device that is distinct from the software runtime.

In some such embodiments, sending the given code module to different remote devices that have different device-specific support for the platform-independent device function corresponding to the given code module comprises sending the given code module to different remote devices comprised in a safety infrastructure of a facility. In a particular embodiment, the computing device is comprised in an evacuation signaling system of the facility and the platform-independent message further indicates an emergency.

In some such embodiments, sending the given code module to different remote devices that have different device-specific support for the platform-independent device function corresponding to the given code module comprises sending the given code module to different remote devices comprised in a vehicle traffic management system. In a particular embodiment, the computing device is comprised in an emergency vehicle and the platform-independent message further indicates an emergency.

Embodiments also include corresponding methods and computer readable storage mediums. Some embodiments, for example, include a computing device for supporting distributed application execution. The computing device comprises a processor and a memory. The memory contains instructions executable by the processor whereby the computing device is configured to receive an application definition that identifies a plurality of platform-independent device functions to be performed by an application. The computing device is further configured to map the platform-independent device functions to corresponding code modules stored in a code module repository, and distribute the corresponding code modules to a plurality of remote devices for distributed execution of the application by the remote devices according to device-specific support for the platform-independent device by the remote devices. To distribute, the computing device is configured to send a given code module to different remote devices that have different device-specific support for the platform-independent device function corresponding to the given code module.

In some embodiments, the computing device is further configured to trigger execution of the different device-specific support for the platform-independent device function corresponding to the given code module by at least two of the different remote devices by sending, to the least two different remote devices, a platform-independent message indicating an event has occurred.

In some such embodiments, each of the at least two of the different remote devices comprises an output interface for messaging a user and to trigger the execution of the different device-specific support by the at least two of the different remote devices the computing device is configured to trigger each of the at least two of the different remote devices to use their output interface for differently messaging the user.

In some such embodiments, the device-specific support for the platform-independent device function of a given remote device of the at least two different remote devices comprises a plurality of device-specific functions, and by sending the platform-independent message to the given remote device the computing device further triggers autonomous selection of a device-specific function, by the given remote device, from the plurality of device-specific functions.

In some such embodiments, the computing device is configured to send the platform-independent message to the at least two different remote devices responsive to selecting the at least two different remote devices from the different remote devices based on the event.

In some such embodiments, the computing device is further configured to generate the platform-independent message by a software runtime executing on the computing device and detect the occurrence of the event by a platform-specific function of the computing device that is distinct from the software runtime.

In some such embodiments, to send the given code module to different remote devices that have different device-specific support for the platform-independent device function corresponding to the given code module, the computing device is configured to send the given code module to different remote devices comprised in a safety infrastructure of a facility. In a particular embodiment, the computing device is comprised in an evacuation signaling system of the facility and the platform-independent message further indicates an emergency.

In some such embodiments, to send the given code module to different remote devices that have different device-specific support for the platform-independent device function corresponding to the given code module the computing device is configured to send the given code module to different remote devices comprised in a vehicle traffic management system. In a particular embodiment, the computing device is comprised in an emergency vehicle and the platform-independent message further indicates an emergency.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of a remote device 115, generally, as opposed to discussion of particular instances of remote devices 115a, 115b).

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

Figure 1:
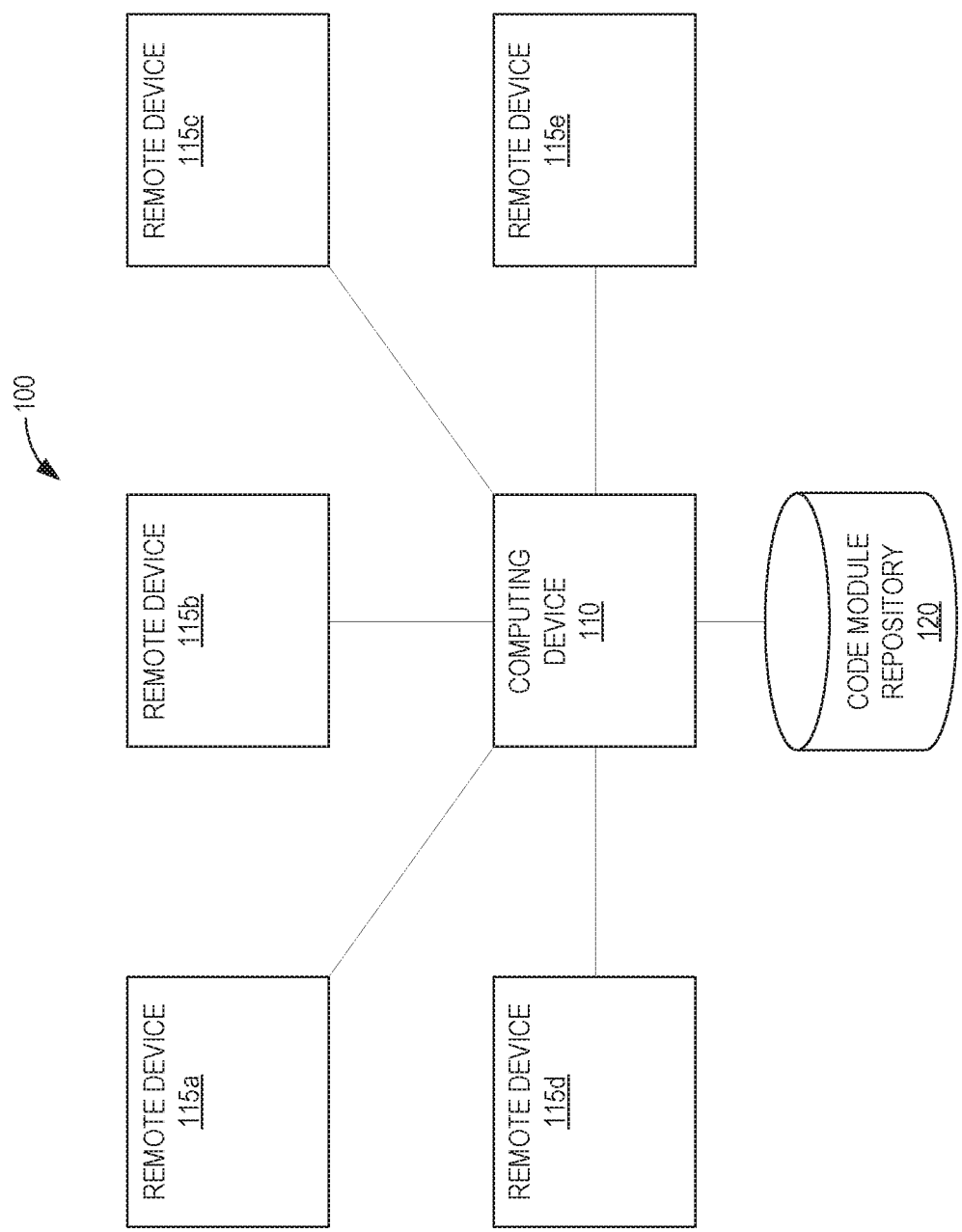
FIG. 1 is a block diagram illustrating an example computing environment according to embodiments of the present disclosure.

Embodiments of the present disclosure generally relate to distributed application execution. FIG. 1 illustrates an exemplary computing environment 100 according to various embodiments. The computing environment 100 comprises a computing device 110, a plurality of remote devices 115a-e, and a code module repository 120. As will be discussed in greater detail below, the computing device 110, remote devices 115a-e, and/or code module repository 120 may each comprise its own interface circuitry (not shown) configured to exchange signals with one or more of the others.

Communication between communication device 110 and one or more of the remote devices 115a-e and/or code module repository 120 may be wired or wireless, direct or via an intermediate network (not shown) according to various embodiments. For example, computing device 110 may be in communication with remote device 115a via BLUETOOTH, remote device 115b via near-field communication, remote device 115c via Wi-Fi, remote device 115d via wired Ethernet through an intermediate packet router (not shown), and remote device 115e via a cellular communications network (not shown). According to another example, the computing device 110 is in direct communication with remote devices 115a-e over the same type of communication interface, e.g., Wi-Fi.

Typical examples of the remote devices 115a-e include (but are not limited to) an alarm device, display, networking device, audio device, personal computer, laptop computer, desktop computer, workstation, smartphone, tablet computer, wearable computer, smart appliance, server computer, server cluster, network attached storage, and/or a storage area network.

Typical examples of the computing device 110 include (but are not limited to) a server computer, server cluster, personal computer, laptop computer, desktop computer, workstation, smartphone, tablet computer, wearable computer, smart appliance, network attached storage, and/or a storage area network.

Typical examples of the code module repository 120 may be a database stored on network-attached storage, storage area network, a hard drive, and/or solid state drive. Although not depicted in FIG. 1, other examples of the code module repository may be a database stored on the computing device 110 and/or one or more of the remote devices 115a-e.

According to embodiments, the computing device 110 may be configured to discover the remote devices 115a-e with which the computing device is able to communicate. As will be discussed in greater detail below, this discovery of the remote devices 115a-e may be in response to detecting a particular event. Additionally or alternatively, the discovery of the remote devices 115a-e may be part of initializing the computing environment 100 for distributed application execution, as will be discussed further below. Generally, the discovery of the remote devices 115a-e may occur at any time, periodically, and/or in parallel with any of the methods as will be described herein. As will be explained in more detail below, the code module repository 120 may be configured to store code used by the remote devices 115a-e.

Figure 2:
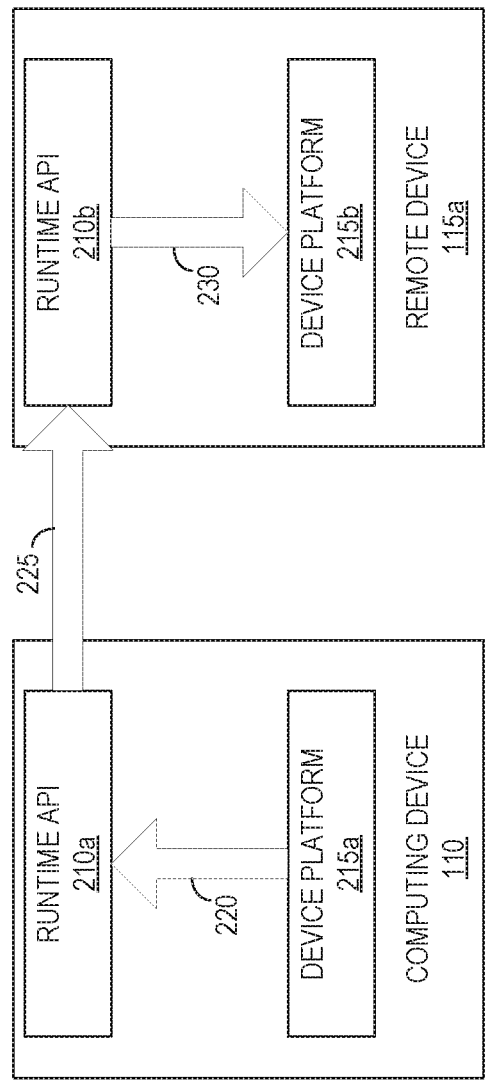
FIG. 2 is a block diagram illustrating an example of messaging between a computing device and a remote device according to embodiments of the present disclosure.

FIG. 2 generally illustrates an example of communication between the computing device 110 and a remote device 115a, according to particular embodiments. As shown in FIG. 2, the computing device 110 comprises device platform 215a and runtime application programming interface (API) 210a. The device platform 215a comprises hardware and/or software that detects the occurrence of one or more events and provides the runtime API with one or more corresponding notifications 220. According to embodiments, an event includes any external trigger that causes one or both of the device platform 215a or runtime API 210a to produce a token in the communication flow. Examples of such an event may include a user pressing a button of the device platform 215a, a hardware or software clock reaching a certain time, or a sensor in the device platform 215a reaching a particular value.

According to embodiments, one or both of the runtime APIs 210a-b is a software runtime for controlling their respective devices 110, 115a. For example, one or both of the runtime APIs 210a-b may be a virtual machine that allows other devices and/or software to invoke device-specific functionality by exposing a cross-platform API. Such a virtual machine may include, for example, the Java Virtual Machine (JVM). According to embodiments, the runtime APIs 210a-b be migrated to and from their respective devices 110, 115a to change how device-specific functions are performed thereon once the runtime API is up and running. In some embodiments, the complexity of devices 110, 115a may be dramatically increased or decreased based on the particular runtimes API 210a, 210b loaded thereon. For example, from the perspective of the remote device 115a, the computing device 110 may be transformed from a highly-complex multi-function server cluster to a simple emergency notification switch by simply exchanging the runtime API 210a loaded on the computing device 110 with a simpler one. In some embodiments, the device platform 215a would not be changed by changing the runtime API 210a loaded thereon, such that hardware and/or software with device-specific knowledge of the computing device 110 would be unaffected.

The runtime API 210a is a software abstraction layer that accepts the notification 220 from the platform code 215a and generates a platform-independent message 225 (that indicates the occurrence of the event) based on the received notification 220. The computing device sends this platform-independent message 225 to the remote device 115a.

The remote device 115a comprises its own runtime API 210b and platform code 215b. The runtime API 210b receives the platform-independent message 225 and, in some embodiments, autonomously decides how to respond to the occurrence of the event, e.g., by deciding which device-specific functionality to invoke. This may effectively insulate the computing device 110 from decisions about how different remote devices 115 should respond to the event, given their particular capabilities for doing so. For example, in response to an event, the runtime API 210b autonomously decides which device-specific function provided by the device platform 215b to invoke based on the event received. In response to this determination, the runtime API 210b invokes the device-specific function of the device platform 215b with an appropriate command 230 according to the autonomous decision. The device platform 215b then performs the device-specific function. This device-specific function may be part of the distributed execution of a more complex application by a plurality of remote devices 115.

In some embodiments, the platform-independent message 225 is a message that is not supported by any protocol of either or both of the device platforms 215a, 215b. The platform-independent message 225 may additionally or alternatively be unaware of either or both of the device platforms 215a, 215b. For example, according to embodiments, the device platform 215a of the computing device 110 may comprise one or more sensors and/or software agents. Examples of such a sensor include a temperature sensor, pressure sensor, switch, or button. Examples of such a software agent include an event handler or network service. According to embodiments, the computing device 110 detects the event via one or more of such sensors and/or software agents. In such an example, the platform-independent message 225 may have no knowledge of and/or be agnostic to the device platform 215a, including any or all of its sensors and/or software agents.

According to embodiments, the device platform 215b of the remote device 115a may comprise one or more output interfaces (e.g., of different types) for messaging a user. Examples of such an output interface include a display, speaker, or haptic device. In some embodiments, autonomously deciding which device-specific function to invoke includes autonomously deciding which of multiple output interfaces to use. In some embodiments, autonomously deciding which device-specific function to invoke includes autonomously deciding what output to send to a particular output interface (e.g., what sound to play to a speaker, what message to present to a display).

Figure 3:
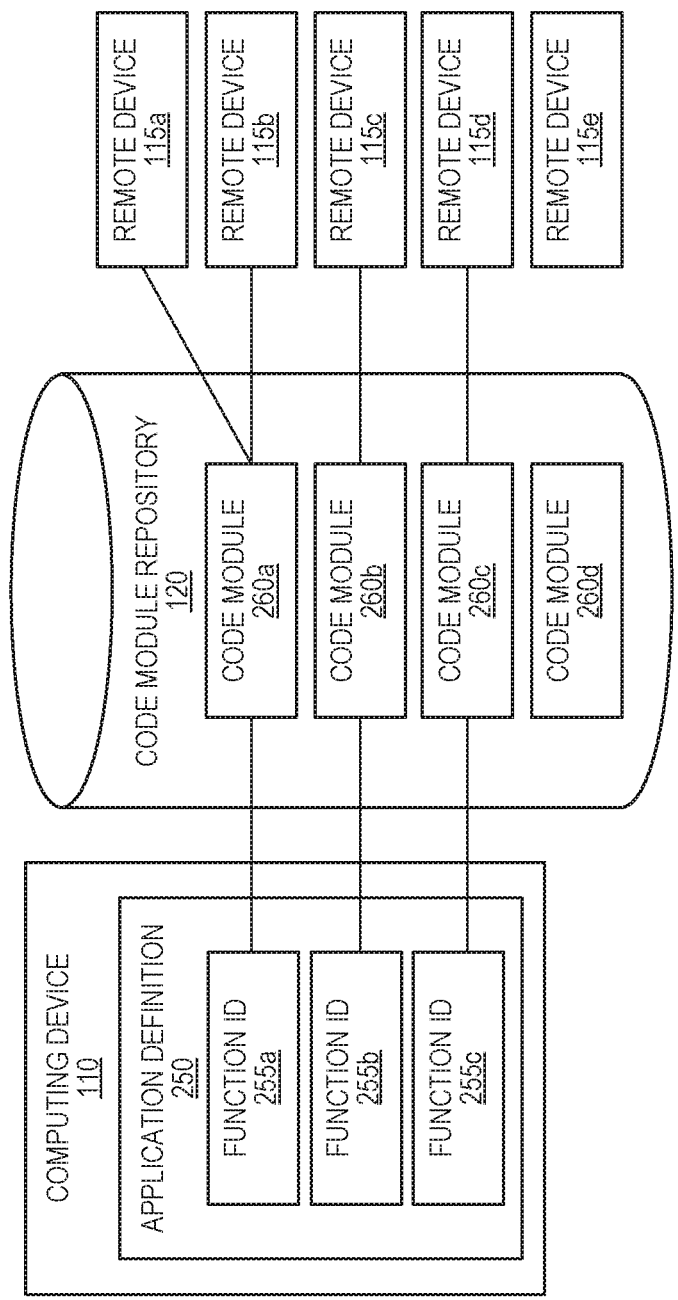
FIG. 3 is a block diagram illustrating code module distribution according to embodiments of the present disclosure.

Messaging, such as that illustrated in FIG. 2, may be used during the distributed execution of a given application. FIG. 3 illustrates an example embodiment in which the computing device 110 distributes code modules 260 in support of distributed application execution, given a particular application definition 250. The application definition 250 may be, for example, a script or source code received from user input, the code module repository 120, and/or a remote device 115a-e.

The application definition 250, according to this example, identifies a plurality of device functions in a platform-independent manner. For example, the application definition 250 may include function identifiers 255a-c "start," "alert," and "stop," respectively, each of which is not specific to computing device 110 or the remote devices 115a-e. Rather, each of "start," "alert," and "stop" may have a different effect depending on whether the function 255 is performed by, e.g., remote device 115a as opposed to remote device 115b. For example, "start" as executed by a car may trigger the engine to start running, whereas "start" as executed by a copy machine may instead trigger the copier to make a photocopy.

The code module repository 120 may store any number of code modules 260, according to various embodiments. In the embodiment of FIG. 3, the code module repository 120 stores four code modules 260*a-d*. Each code module 260*a-d* may include, for example source and/or object code that may be understood by an appropriate execution engine, such as (for example) a runtime API 210 executing on one or more remote devices 115. According to this example, the computing device 110 maps the platform-independent device functions 255*a-c* identified in the application definition 250 to corresponding code modules 260*a-c* stored in the code module repository 120.

The computing device 110 then distributes each of the mapped code modules 260*a-c* to one or more of the remote devices 115*a-e* that have device-specific support for the corresponding platform-independent function 255*a-c* in the application definition 250. In this particular example, the computing device 110 distributes the code modules 260*b-c* by sending code modules 260*b-c* to remote devices 115*c-d* which have device-specific support for the platform-independent functions 255*b-c*, respectively, as identified in the application definition 250. The computing device 110 also sends code module 260*a* to remote device 115*a* and 115*b*, which may be, for example, due to remote devices 115*a-b* each having device-specific support for platform-independent function 255*a*.

For example, if a platform-independent function 255 is "alert," numerous remote devices 115 within the same facility, range, and/or area may have an output interface that supports alerting. In some embodiments, some or all of the remote devices 115 discovered by the computing device 110 have the same device-specific support for the particular platform-independent function. For example, there may be several loudspeakers within a facility that support alerting by making an audible wail. According to further embodiments, some or all of the remote devices 115 have different device-specific support for the particular platform-independent function. For example, within a facility, there may be a loudspeaker that supports wailing and a strobe lamp that supports flashing (e.g., as may be found in a fire alarm system). In yet further embodiments, some remote devices 115 have the same device-specific support for the particular platform-independent function, while at least one other remote device 115 has different device-specific support. For example, a facility may have three loudspeakers (each of which supports wailing) and four strobe lights (each of which supports flashing). Other embodiments include different platform-independent functions 255 and/or device-specific support. For example, other platform-independent functions 255 may relate to other ways of messaging and/or alerting a user, and other remote devices 115 may message and/or alert a user in other ways (e.g., vibration, displaying a message in a user interface).

Consistent with the above, the computing device 110 may send a given code module 260 to one, some, or all of the remote devices 115 having device-specific support for a given platform-independent function 255. In particular, the computing device 110 may select which of the remote devices 115 to send a given code module 260 based on, for example, the particular platform-independent function 255 and/or the device-specific support of the remote devices 115. For example, the computing device 110 may send a code module 260 corresponding to the "alert" function to two remote devices 115 that have sirens to trigger an audible wail and to two remote devices 115 that have strobe lights to trigger a visible flash, but may omit sending that same code module 260 to a printer to avoid triggering a low toner warning. Consistent with aspects of the above, FIG. 3 illustrates an example in which computing device 110 sends code module 260*a* to remote device 115*a* and remote device 115*b*, but does not send code module 260*a* (or any other code module 260*b-d*) to remote device 115*e*.

Further, some embodiments may include distributing fewer than all of the code modules 260 in the code module repository 120. For example, one or more code modules 260 in the code module repository 120 may not correspond to any platform-independent function 255 identified in the application definition 250. Consistent with such embodiments, as illustrated in the example of FIG. 3, the computing device 110 does send code module 260*d* to any of the remote devices 115*a-e*.

Figure 4:
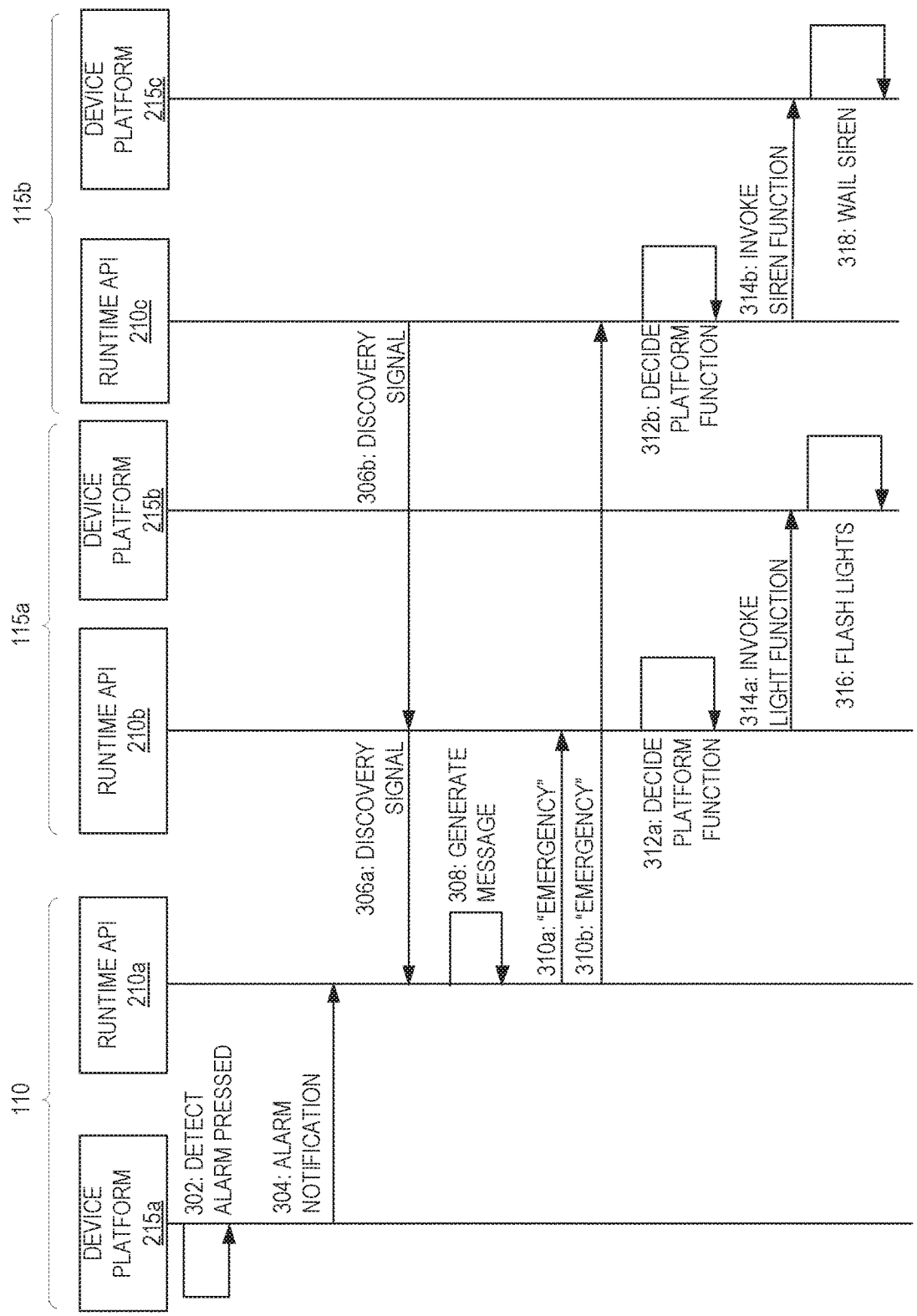
FIG. 4 is a signaling diagram illustrating an example of signaling between a computing device and different remote devices according to embodiments of the present disclosure.

A remote device 115 may immediately execute a device-specific function upon receiving a code module 260 or may wait for a platform-independent message 225 to trigger execution of the device-specific function, according to particular embodiments. FIG. 4 illustrates an example in which the different remote devices 115*a*, 115*b* have been sent the same code module 260*a* and receive the same platform-independent message 225 indicating that an event has occurred. The different remote devices 115*a*, 115*b* are triggered by this platform-independent message 225 to perform different functions based on the device-specific support provided by each remote device's 115*a*, 115*b* respective device platform 215*b*, 215*c*. In the example of FIG. 4, the device platform 215*a* of computing device 110 comprises a big red button labeled "Press In Case of Emergency," the device platform 215*b* of remote device 115*a* comprises a set of strobe lights, and the device platform 215*c* of remote device 115*b* comprises a loudspeaker. Other embodiments may include other physical input and/or output hardware and/or software.

The device platform 215*a* detects that the big red button has been pushed (step 302), and in response, sends an alarm notification to the runtime API 210*a* (step 304). The runtime API 210*a*, in response to detecting the occurrence of the event, discovers remote devices 115*a*, 115*b*. In this example, computing device 110 receives a discovery signal from remote device 115*a* (step 306*a*). Examples of such a discovery signal include one or more Universal Plug and Play (UPnP), Bonjour, Simple Service Discovery Protocol (SSDP), and/or Link Layer Discovery Protocol (LLDP) messages. The particular discovery signal received by the runtime API 210*a*, as illustrated in FIG. 3, contains information from remote device 115*b* that was collected by remote device 115*a* (step 306*b*), which remote device 115*a* forwards in its own discovery signal.

According to other embodiments, the computing device 110 receives a discovery signal from each of the remote devices 115*a*, 115*b*. According to further embodiments, the computing device 110 also receives discovery signals from other remote device (e.g., remote devices 115*c-e*, not shown in FIG. 3), and decides whether or not to include these other remote devices as a recipient of the platform-independent message 225.

Having at least discovered remote devices 115*a*, 115*b*, the computing device generates a platform-independent message 225 indicating the occurrence of the event (step 308). In some embodiments, the platform-independent message 225 is generated based on the event, e.g., using certain information in the event notification 220.

In this example, the computing device 110 generates the platform-independent message 225 "EMERGENCY" and sends the platform-independent message 225 to each of the multiple remote device 115a, 115b (step 310a, 310b) to trigger each of them to autonomously decide which platform-specific function to invoke in response to the event. In this example, in response to the "EMERGENCY" message indicating that the occurrence of the button-press event, the respective runtime API 210b of remote device 115a decides to invoke the light function (step 312a), whereas the runtime API 210c of remote device 115b decides to invoke the siren function (step 312b). Each runtime API 210b, 210c then invokes the respective functions according to their respective decisions (step 314a, 314b), e.g., by sending a platform-specific command to the respective device platforms 215b, 215c. In response, device platform 215b flashes its lights (step 316), whereas device platform 215c wails its siren (step 318).

Distributed application execution based on device-specific support for platform-independent functions 255a-c, as described above, may be useful in a variety of particular embodiments. For example, the remote devices 115a-b may be comprised in a safety infrastructure of a facility. In such an example, the computing device 110 may be comprised in an evacuation signaling system of that facility. Thus, the example illustrated in FIG. 4 may be part of an emergency evacuation application executed by the remote devices 115a-b of the facility in response to a user pressing the button-press event at the computing device 110.

Other types of events, systems, and devices may additionally or alternatively be used, according to particular embodiments. For example, the remote devices 115a-b may be comprised in a vehicle traffic management system. According to such an example, remote device 115a may be a railroad crossing gate and remote device 115b may be a traffic light, and computing device 110 may be comprised in an emergency vehicle (e.g., a police car, fire truck, or ambulance). The computing device 110 may detect that the user has flipped a switch in the emergency vehicle, and in response send a "lockdown" platform-independent message 225 to the remote devices 115a-b. In response, the railroad crossing gate may lower and the traffic light may turn red. Other actions may be performed by other remote devices 115, as may be appropriate.

Figure 5:
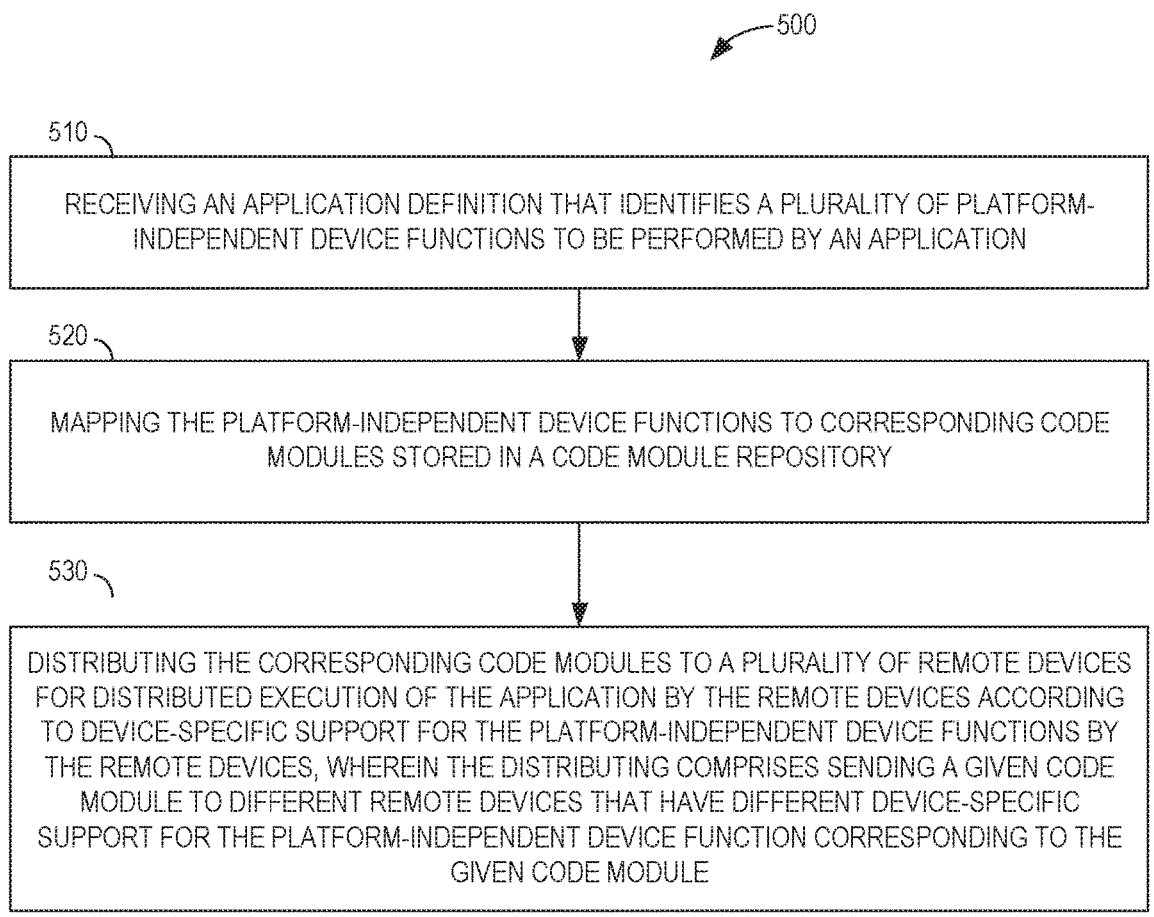
FIG. 5 is a flow diagram illustrating an exemplary method implemented by a computing device according to embodiments of the present disclosure.

In view of the above, FIG. 5 illustrates an example method 500 implemented by a computing device 110. The method 500 comprises receiving an application definition 250 that identifies a plurality of platform-independent device functions 255a-c to be performed by an application (block 510). The method 500 further comprises mapping the platform-independent device functions 255a-c to corresponding code modules 260a-c stored in a code module repository 120 (block 520). The method 500 further comprises distributing the corresponding code modules 260a-c to a plurality of remote devices 115a-d for distributed execution of the application by the remote devices 115a-d according to device-specific support for the platform-independent device functions 255a-c by the remote devices 115a-d (block 530). In particular, the distributing comprises sending a given code module 260a to different remote devices 115a-b that have different device-specific support for the platform-independent device function 255a corresponding to the given code module 260a.

Figure 6:
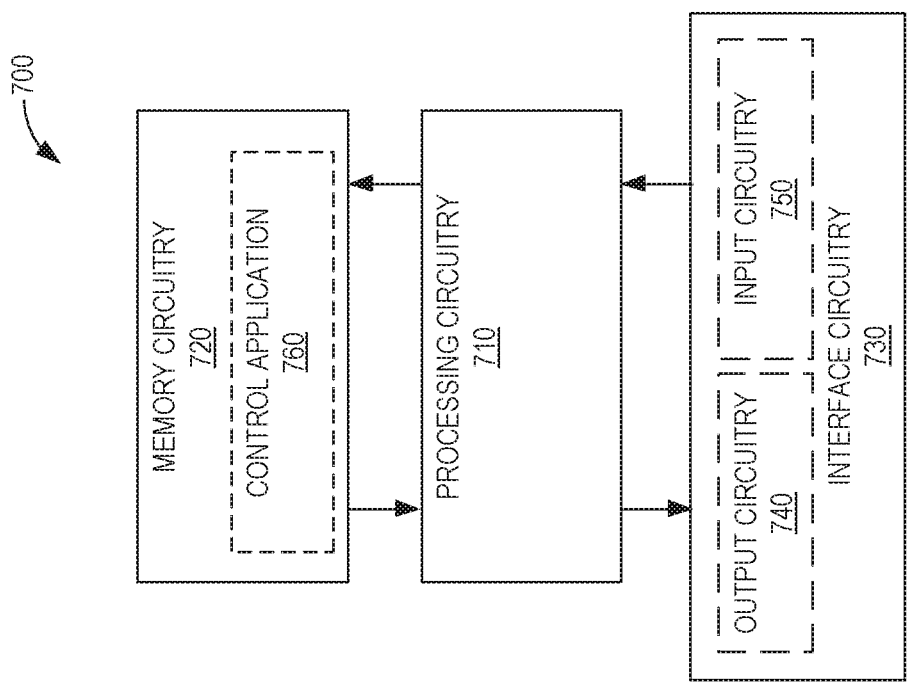
FIG. 6 is a block diagram illustrating example hardware useful for implementing the methods described herein, according to embodiments of the present disclosure.

Other embodiments of the present disclosure include the computing device 110 implemented according to the hardware 700 illustrated in FIG. 6. The example hardware 700 of FIG. 6 comprises processing circuitry 710, memory circuitry 720, and interface circuitry 730. The processing circuitry 710 is communicatively coupled to the memory circuitry 720 and the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the computing device 110. Such I/O data paths may include data paths for exchanging signals with other hardware (e.g., over a communications network) and data paths for exchanging signals with a user. For example, the interface circuitry 730 may comprise a transceiver configured to send and receive communication signals over one or more of a cellular network, BLUETOOTH connection, Wi-Fi connection, Ethernet network, or optical network. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. Additionally or alternatively, the interface circuitry 730 may comprise one or more of an audio adapter, headset jack, and/or speaker for outputting sound to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry 740 (e.g., transmitter circuitry configured to send communication signals to other devices and/or a communications network) and input circuitry 750 (e.g., receiver circuitry configured to receive communication signals from other devices and/or a communications network). Similarly, the output circuitry 740 may comprise a display, whereas the input circuitry 750 may comprise a keyboard. Other examples, permutations, and arrangements of the above and their equivalents will be readily apparent to those of ordinary skill.

According to embodiments, the memory circuitry 720 contains instructions 760 executable by the processing circuitry 710 whereby the computing device 110 is configured to receive an application definition 250 that identifies a plurality of platform-independent device functions 255a-c to be performed by an application, and is configured to map the platform-independent device functions 255a-c to corresponding code modules 260a-c stored in a code module repository 120. The instructions 760 may further configure the computing device 110 to distribute the corresponding code modules 260a-c to a plurality of remote devices 115a-d for distributed execution of the application by the remote devices 115a-d according to device-specific support for the platform-independent device functions 255a-c by the remote devices 115a-d. To distribute, the computing device 110 is configured to send a given code module 260a to different remote devices 115a-b that have different device-specific support for the platform-independent device function 255a corresponding to the given code module 260a.

Figure 7:
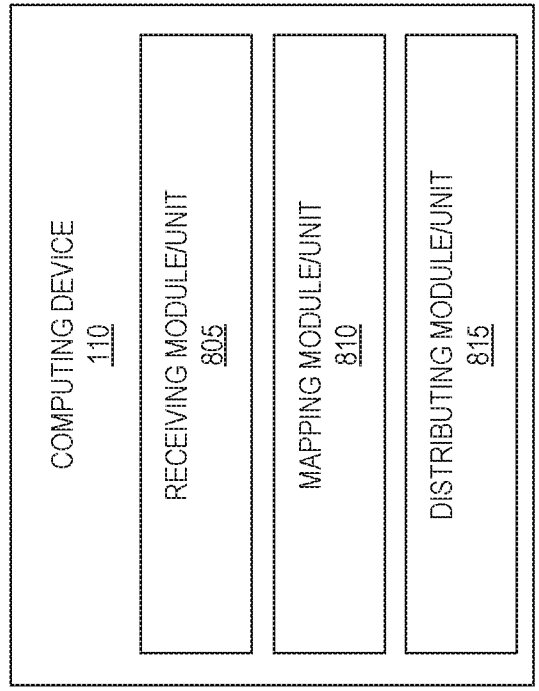
FIG. 7 is a block diagram of a computing device according to embodiments of the present disclosure.

FIG. 7 illustrates additional details of a computing device 110 in accordance with one or more other embodiments. Specifically, the computing device 110 may include a receiving module/unit 805, a mapping module/unit 810, and a distributing module/unit 815. The receiving module/unit 805 is configured to receive an application definition 250 that identifies a plurality of platform-independent device functions 255a-c to be performed by an application. The mapping module/unit 810 is configured to map the platform-independent device functions 255a-c to corresponding code modules 260a-c stored in a code module repository 120. The distributing module/unit 815 is configured to distribute the corresponding code modules 260a-c to a plurality of remote devices 115a-d for distributed execution of the application by the remote devices 115a-d according to device-specific support for the platform-independent device functions 255a-c by the remote devices 115a-d. To distribute, the distributing module 815 is configured to send a given code module 260a to different remote devices 115a-b that have different device-specific support for the platform-independent device function 255a corresponding to the given code module 260a. According to embodiments, one or more of these modules or units may be implemented by the processing circuitry 710 illustrated in FIG. 6. Additionally or alternatively, one or more of these modules or units may be implemented by the control application 760 illustrated in FIG. 6.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of supporting distributed application execution, implemented by a computing device, the method comprising:
    sending a code module to different remote devices that have different device-specific support for a platform-independent device function;
    detecting, by a platform-specific function of the computing device, that an event has occurred;
    generating, by a software runtime distinct from the platform-specific function and executing on the computing device, a platform-independent message indicating that the event has occurred;
    sending the platform-independent message to at least two of the different remote devices to trigger each to autonomously select a device-specific function from a plurality of device-specific functions, and execute the different device-specific support for the platform-independent device function;
    wherein each of the at least two of the different remote devices comprises an output interface and triggering each of the at least two of the different remote devices to execute the different device-specific support comprises triggering each of the at least two of the different remote devices to use their output interface for outputting differently from each other.

2. The method of claim 1, further comprising distributing a plurality of code modules to a plurality of remote devices for distributed execution of an application by the remote devices according to respective device-specific support for corresponding platform-independent device functions, the distributing of the plurality of code modules comprising the sending of the code module to the different remote devices.

3. The method of claim 1, further comprising receiving an application definition that identifies the platform-independent device function, wherein sending the code module to the different remote devices enables the different remote devices to support the distributed application execution in accordance with the application definition.

4. The method of claim 1, further comprising mapping the platform-independent device function to the code module.

5. The method of claim 1, wherein the output interface of each of the at least two of the different remote devices is for messaging a user and each of the at least two of the different remote devices outputting differently from each other comprises each of the at least two of the different remote devices messaging the user differently from each other.

6. The method of claim 1, wherein sending the platform-independent message to the at least two of the different remote devices is responsive to selecting the at least two of the different remote devices from the different remote devices based on the event.

7. The method of claim 1, wherein the different remote devices are comprised in a safety infrastructure of a facility or in a vehicle traffic management system.

8. The method of claim 7, wherein the different remote devices are comprised in the safety infrastructure of the facility, the computing device is comprised in an evacuation signaling system of the facility, and the platform-independent message further indicates an emergency.

9. The method of claim 7, wherein the different remote devices are comprised in the vehicle traffic management system, the computing device is comprised in an emergency vehicle, and the platform-independent message further indicates an emergency.

10. A computing device for supporting distributed application execution, the computing device comprising:
    processing circuitry and a memory, the memory containing instructions executable by the processing circuitry such that the computing device is configured to:
        send a code module to different remote devices that have different device-specific support for a platform-independent device function;
        execute a platform-specific function of the computing device to detect that an event has occurred;
        execute a software runtime, distinct from the platform-specific function, to generate a platform-independent message indicating that the event has occurred;
        send the platform-independent message to at least two of the different remote devices to trigger each to autonomously select a device-specific function from a plurality of device-specific functions, and execute the different device-specific support for the platform-independent device function;
    wherein each of the at least two of the different remote devices comprises an output interface and triggering each of the at least two of the different remote devices to execute the different device-specific support comprises triggering each of the at least two of the different remote devices to use their output interface for outputting differently from each other.

11. The computing device of claim 10, wherein the computing device is further configured to distribute a plurality of code modules to a plurality of remote devices for distributed execution of an application by the remote devices according to respective device-specific support for corresponding platform-independent device functions, the distributing of the plurality of code modules comprising the sending of the code module to the different remote devices.

12. The computing device of claim 10, wherein the computing device is further configured to:
receive an application definition that identifies the platform-independent device function to be performed by the application; and
enable the different remote devices to support the distributed application execution in accordance with the application definition by sending the code module to the different remote devices.

13. The computing device of claim 10, wherein the computing device is further configured to map the platform-independent device function to the code module.

14. The computing device of claim 10, wherein the output interface of each of the at least two of the different remote devices is for messaging a user and each of the at least two of the different remote devices outputting differently from each other comprises each of the at least two of the different remote devices messaging the user differently from each other.

15. The computing device of claim 10, wherein the computing device is configured to send the platform-independent message to the at least two of the different remote devices responsive to selecting the at least two of the different remote devices from the different remote devices based on the event.

16. The computing device of claim 10, wherein the different remote devices are comprised in a safety infrastructure of a facility or in a vehicle traffic management system.

17. The computing device of claim 16, wherein the different remote devices are comprised in the safety infrastructure of the facility, the computing device is comprised in an evacuation signaling system of the facility, and the platform-independent message further indicates an emergency.

18. The computing device of claim 16, wherein the different remote devices are comprised in the vehicle traffic management system, the computing device is comprised in an emergency vehicle, and the platform-independent message further indicates an emergency.

19. A non-transitory computer readable medium storing a computer program product for controlling a programmable computing device, the computer program product comprising software instructions that, when run on the programmable computing device, cause the programmable computing device to:
send a code module to different remote devices that have different device-specific support for a platform-independent device function;
detect, by a platform-specific function of the computing device, that an event has occurred;
generate, by a software runtime distinct from the platform-specific function and executing on the computing device, a platform-independent message indicating that the event has occurred;
send the platform-independent message to at least two of the different remote devices to trigger each to autonomously select a device-specific function from a plurality of device-specific functions, and execute the different device-specific support for the platform-independent device function;
wherein each of the at least two of the different remote devices comprises an output interface and triggering each of the at least two of the different remote devices to execute the different device-specific support comprises triggering each of the at least two of the different remote devices to use their output interface for outputting differently from each other.

* * * * *